US012290082B2

(12) United States Patent
Hasjim et al.

(10) Patent No.: US 12,290,082 B2
(45) Date of Patent: May 6, 2025

(54) POROUS STARCH AS BULKING AGENT IN CHEWING-GUMS

(71) Applicant: ROQUETTE FRERES, Lestrem (FR)

(72) Inventors: Jovin Hasjim, Shanghai (CN); Zhiqin Xu, Shanghai (CN); Bernard Pora, Shanghai (CN)

(73) Assignee: Roquette Freres, Lestrem (FR)

( * ) Notice: Subject to any disclaimer, the term of this patent is extended or adjusted under 35 U.S.C. 154(b) by 297 days.

(21) Appl. No.: 17/904,062

(22) PCT Filed: Feb. 12, 2021

(86) PCT No.: PCT/EP2021/053410
§ 371 (c)(1),
(2) Date: Aug. 11, 2022

(87) PCT Pub. No.: WO2021/160779
PCT Pub. Date: Aug. 19, 2021

(65) Prior Publication Data
US 2023/0083049 A1    Mar. 16, 2023

(30) Foreign Application Priority Data
Feb. 13, 2020  (CN) .......................... 202010090241.5

(51) Int. Cl.
*A23G 4/10*    (2006.01)
*A23G 4/02*    (2006.01)
*A23G 4/04*    (2006.01)

(52) U.S. Cl.
CPC ............... *A23G 4/10* (2013.01); *A23G 4/025* (2013.01); *A23G 4/043* (2013.01); *A23G 2200/06* (2013.01)

(58) Field of Classification Search
CPC .......... A23G 4/10; A23G 4/025; A23G 4/043
See application file for complete search history.

(56) References Cited

U.S. PATENT DOCUMENTS

| 5,919,486 A | 7/1999 | Ishii et al. |
| 2004/0166197 A1 | 8/2004 | Ribadeau-Dumas et al. |
| 2008/0299249 A1 | 12/2008 | Hirt |
| 2013/0078193 A1 | 3/2013 | Wonschik |
| 2019/0297912 A1 | 10/2019 | Busolin |

FOREIGN PATENT DOCUMENTS

| CN | 1546529 A | 11/2004 |
| CN | 108671212 A | 10/2018 |
| WO | 8904842 A1 | 6/1989 |
| WO | 2011/000524 A1 | 1/2011 |
| WO | 2012/099260 A1 | 7/2012 |
| WO | 2012/107206 A1 | 8/2012 |

OTHER PUBLICATIONS

Yao Weirong, et al. "Adsorbent Characteristics of Porous Starch", Starch/Starke, Wiley-VCH Verlag, Weinheim, DE, vol. 54, No. 6, Jun. 1, 2002 (Jun. 1, 2002), pp. 260-263, XP001116392, ISSN: 0038-9056, DOI: 10.1002/1521-379X(200206)54:6<260::AID-STA R260>3.0.CO;2-Z; pp. 260,262.
Grembecka, "Sugar alcohols—their role in the modern world of sweeteners: a review," Eur Food Res Technol (2015) 241:1-14.

*Primary Examiner* — Jenna A Watts

(57) ABSTRACT

The present invention relates to the use of porous starch as bulking agent in a chewing gum. The present invention also relates to a process of fabricating the chewing gum and to a chewing gum composition comprising porous starch as bulking agent.

23 Claims, 2 Drawing Sheets

POROUS STARCH AS BULKING AGENT IN CHEWING-GUMS

FIELD OF THE INVENTION

The present invention relates to the use of porous starch as bulking agent in a chewing gum. The present invention also relates to a process of fabricating the chewing gum and to a chewing gum composition comprising porous starch as bulking agent.

BACKGROUND

Chewing gum compositions generally contain a gum base, a flavouring agent and sweeteners that are either naturals or artificial. Also, to improve consistency and to generally enhance the mouthfeel, the gum may contain various additives such as plasticizers, softeners and bulking agents. Typically, bulking agents are sugars and polyols and aim to increase the bulk and volume of the chewing gum without affecting its taste.

In last decades, sucrose was the most used bulking agent in chewing gums. However, sucrose may lead to dental caries, may cause gastrointestinal disturbances and is not adapted to diabetic consumers or consumers looking for sugar-free chewing gums.

For these reasons, food manufacturers have replaced sucrose by polyols such as sorbitol, maltitol, isomalt, mannitol and xylitol. Nevertheless, it cannot be satisfactory because more and more consumers are looking for natural ingredients. Furthermore, such polyols generally cause gastrointestinal disturbances to the consumers.

There is thus a need to provide sugar-free bulking agents in chewing gums which are toothfriendly and do not cause gastrointestinal disturbances for the consumer while possessing an acceptable flavour and mouthfeel.

The present inventors have surprisingly found that porous starch can be used as bulking agent in chewing gums. In particular, porous starch is perceived as a natural and healthy ingredient by the consumers, is toothfriendly, does not cause gastrointestinal disturbances and does not have tolerance issues while possessing an acceptable flavour and mouthfeel in chewing gums.

SUMMARY OF THE INVENTION

A first object of the present invention is directed to the use of porous starch as bulking agent to replace partially or totally sugars and/or partially polyols such as sugar alcohols in a chewing gum composition.

A second object of the present invention relates to a chewing gum composition comprising a bulking agent containing or consisting of a porous starch.

A third object of the present invention relates to a process of fabricating the chewing gum composition of the present invention comprising the step of adding porous starch as bulking agent.

A fourth object of the present invention relates to a chewing gum obtained from the process of the present invention.

DETAILED DESCRIPTION

A first object of the present invention is directed to the use of porous starch as bulking agent to replace partially or totally sugars and/or partially polyols such as sugar alcohols in a chewing gum composition.

In the present invention, "chewing gum" refers to chewing gum, bubble gum, and the like. The chewing gum may be formed into sticks, tabs, chunks, tapes, coated or uncoated pellets or balls or any other desired form.

As used herein the expression "porous starch" refers to a granular starch that has been hydrolyzed by one or multiple amylolytic enzymes until multiple pores are visible on the surface of the starch granules by microscopic technique.

According to the present invention, porous starch may be produced through an enzymatic hydrolysis of native starch granules with one or multiple amylolytic enzymes, such as α-amylase and amyloglucosidase, at a temperature inferior to the gelatinization temperature of the starch.

The native starch granules may be based on tapioca, waxy tapioca, maize, pea, potato, waxy potato, wheat, waxy wheat, waxy maize, mung bean, rice, waxy rice, sweet potato, waxy sweet potato, millet, sago, sorghum, quinoa, arrowroot, amaranth, lotus root and buckwheat.

As used herein the expression "native starch" refers to a starch coming from natural sources. It does not result from enzymatic or chemical processing methods. Typical native sources for the starches are cereal, tubers, roots, legumes and fruits. In the present invention, native starch may be recovered from native sources such as tapioca, waxy tapioca, maize, pea, potato, waxy potato, wheat, waxy wheat, waxy maize, mung bean, rice, waxy rice, sweet potato, waxy sweet potato, millet, sago, sorghum, quinoa, arrowroot, amaranth, lotus root and buckwheat by extraction processes. Native starch is normally extracted using either wet milling or dry milling known processes.

In particular, native starch granules may be hydrolyzed with an acid such as hydrochloric acid or sulfuric acid, before enzyme hydrolysis such as by α-amylase or amyloglucosidase, at a temperature inferior to the gelatinization temperature of the starch.

Alternatively, porous starch granules obtained by enzyme hydrolysis such as by α-amylase or amyloglucosidase, may be further hydrolyzed with an acid such as hydrochloric acid or sulfuric acid, at a temperature inferior to the gelatinization temperature of the starch.

The particle size of the resulting starch granules may be further reduced by grinding, homogenizing or micronization.

The resulting starch granules may have a porous structure on the surface and inside the granules. Preferably, they have a high number of large and small pores, which may or may not be connected to the hilum though internal channels.

In a preferred embodiment of the present invention, the porous starch used in the present invention has multiple pores on the surface with diameter comprised between 0.01 μm and 5 μm, preferably between 0.05 μm and 2.5 μm, and more preferably between 0.1 μm and 1 μm.

The porosity may be observed using scanning electron microscopy.

In a preferred embodiment of the present invention, the porous starch used in the present invention has a particle diameter comprised between 0.5 μm and 200 μm, preferably between 1 μm and 100 μm, and more preferably between 2 μm and 60 μm.

The particle diameter may be measured by laser diffraction particle sizer (Beckman Coulter LS 13 320).

In a preferred embodiment of the present invention, the starch is selected from the group consisting of tapioca starch, waxy tapioca starch, maize starch, pea starch, potato starch, waxy potato starch, wheat starch, waxy wheat starch, waxy maize starch, mung bean starch, rice starch, waxy rice starch, sweet potato starch, waxy sweet potato starch, millet starch, sago starch, sorghum starch, quinoa starch, arrowroot starch, amaranth starch, lotus root starch and buckwheat starch.

In a preferred embodiment of the present invention, the starch used in the present invention is not gelatinized but is under granular form.

As used herein, the expression "bulking agent" refers to a compound that increases the bulk and volume of food and in particular of a chewing gum, without affecting its taste.

Examples of sugars comprise, but are not limited to, saccharides including monosaccharides, disaccharides, oligosaccharides and polysaccharides, such as xylose, ribose, glucose (dextrose), mannose, galactose, fructose (levulose), dextrin, maltodextrin, invert sugar, glucose syrup, sucrose, maltose, maltotriose, maltotetraose, isomaltose, lactose, trehalose, psicose (allulose), tagatose, maltulose, isomaltulose, lactulose, fructooligosaccharides, galactooligosaccharides, isomaltooligosaccharides and mixtures thereof.

Polyols in food comprise, but are not limited to, sugar alcohols, polyethylene glycol, and polypropylene glycol.

Examples of sugar alcohols comprise, but are not limited to, ethylene glycol, glycerol, galactitol, maltotriitol, maltotetraitol, polyglycitol, mannitol, sorbitol, erythritol, maltitol, xylitol, isomalt, lactitol, and mixtures thereof.

In a preferred embodiment of the present invention, the starch replaces up to 30%, preferably up to 60% and more preferably up to 100% of the sugars and/or polyol powder such as sugar alcohols as bulking agent in the chewing gum composition.

In a preferred embodiment of the present invention, the porous starch represents from 5% to 65%, preferably from 20% to 55% and more preferably from 40% to 50% by weight with respect to the total weight of the chewing gum composition.

The chewing gum composition further comprises a gum base.

Any kind of gum base well known in the art can be used in the chewing gum composition, depending of the type of chewing gum. Chewing gum bases generally comprise a combination of elastomers and resins together optionally with plasticizers and inorganic fillers. The gum base may contain natural gums and/or synthetic elastomers and resins.

Examples of natural gums comprise, but are not limited to, chicle, jelutong, leche caspi (sorva), massaranduba belata, chiguibul, natural rubber (latex solids), and mixtures thereof. The amount of natural gum used in the gum base can be varied depending on the physical properties desired in the final gum base.

Examples of synthetic elastomers comprise, but are not limited to, polybutylene, polyisobutylene, isobutylene-isoprene copolymer, butadiene-styrene rubber, polyethylene, and mixtures thereof. The amount of elastomer used in the gum base can be varied depending on the elastomer selected and on the desired physical properties of the gum base such as viscosity, softening point, and elasticity.

Example of resins that can be used in gum bases comprise, but are not limited to, ester gums, esters of glycerol, polyvinyl acetate (PVA), polyvinyl acetate polyethylene copolymers, vinyl acetate-vinyl laurate copolymer, polyvinyl acetate polyvinyl laureate copolymers, natural or synthetic resins such as terpene resins and polyterpenes, (methyl, glycerol or pentaerythritol) esters of rosins or modified rosins, such as hydrogenated, dimerized or polymerized rosins including pentaerythritol ester of rosin, pentaerythritol ester of partially hydrogenated rosin, glycerol ester of partially dimerized rosin, glycerol ester of partially hydrogenated rosin, glycerol ester of gum rosin, glycerol ester of polymerized rosin, glycerol ester of tall oil rosin, glycerol ester of rosin and partially hydrogenated rosin and partially hydrogenated methyl ester of rosin, and mixtures thereof. The amount of resin used in the gum base can be varied depending on the particular resin selected and on the physical properties desired in the final gum base such as viscosity, softening point, and elasticity.

The gum base may further comprise waxes. Waxes may comprise, but are not limited to, paraffin, paraffin wax, microcrystalline wax, polyethylene-wax homopolymer, natural waxes such as beeswax, carnauba wax, candelilla wax and mixtures thereof.

The gum base may further comprise emulsifiers and softeners. Emulsifiers and softeners may comprise, but are not limited to, propylene glycol, mono- and diglycerides of fatty acids, glycerine (glycerol), pectins, alginic acid, sodium alginate, ammonium alginate, phospholipids, gelatin, triacetin, acetylated mono- and diglycerides (acetic and fatty acid esters of glycerol), stearic acid (and its calcium, magnesium, sodium, potassium salts), sucrose esters of fatty acids, hydrogenated vegetable oils, and cocoa powder and mixtures thereof.

The gum base may further comprise antioxidants and preservatives. Antioxidant and preservatives may comprise, but are not limited to, benzoic acid, sodium benzoate, butylated hydroxyanisole, butylated hydroxytoluene, propyl gallate, sorbic acid, potassium sorbate, vitamin E (dl-α-tocopherol, d-α-tocopherol, and mixed tocopherol concentrate), antioxidante of bamboo leaves and mixtures thereof.

The gum base may further comprise a filler component. Examples of filler comprise, but are not limited to, calcium carbonate, magnesium carbonate, talc, dicalcium phosphate, and mixtures thereof.

The amount of gum base employed will vary greatly depending on various factors such as the type of base used, consistency desired and the other components used to make the chewing gum composition. In a preferred embodiment of the present invention, the gum base represent from 5% to 70%, preferably from 10% to 55% and more preferably from 15% to 40% by weight with respect to the total weight of the chewing gum composition.

The chewing gum composition optionally comprises additives. Preferably, the additives are selected from humectants, emulsifiers, preservatives, softeners, sweeteners, flavoring agents, antioxidants, colorants, acidity regulators, thickeners, stabilizers, coating agents, coagulants, additional fillers, and mixtures thereof. The additives represents from 0% to 35%, preferably from 5% to 30% and even more preferably from 10% to 25% by weight with respect to the total weight of the chewing gum composition.

Humectants refer to substances added for the purpose of helping retention of water in chewing gums. Examples of humectants comprise, but are not limited to, sorbitol and sorbitol syrup, maltitol and maltitol syrup, polydextrose, glycerine (glycerol), potassium lactate, sodium lactate, phosphoric acid, disodium dihydrogen pyrophosphate, tetrasodium pyrophosphate, calcium dihydrogen phosphate, potassium dihydrogen phosphate, diammonium hydrogen phosphate, dipotassium hydrogen phosphate, dicalcium orthophosphate (calcium hydrogen phosphate), tricalcium orthophosphate (calcium phosphate), tripotassium orthophosphate, trisodium orthophosphate, sodium polyphosphate, sodium tripolyphosphate, sodium dihydrogen phosphate, sodium phosphatedibasic, tetrapotassium pyrophosphate, trisodium monohydrogen diphosphate, potassium polymetaphosphate, calcium acid pyrophosphate, and mixtures thereof.

Emulsifiers are substances that can improve the surface tension between the various constitutive phases in the emulsification body to form the even dispersion or emulsification bodies. Examples of emulsifiers comprise, but are not limited to, propylene glycol alginate, diacetyl tartaric acid esters of mono (di) glycerides (DATEM), polyglycerol esters of fatty acids (polyglycerol fatty acid esters), maltitol and maltitol syrup, xylitan monostearate, calcium lactate, sorbitol and sorbitol syrup, octyl and decyl glycerate, magnesium stearate, sucrose esters of fatty acids, mono- and diglycerides of fatty acids, modified soybean phospholipids, glycerine (glycerol), sodium caseinate, phospholipids, enzymatically decomposed soybean phospholipids, citric and fatty acid esters of glycerol, hydroxypropyl starch, lactic and fatty acid esters of glycerol, sodium starch octenyl succinate, acetylated mono- and diglyceride (acetic and fatty acid esters of glycerol) and mixtures thereof.

Preservatives refer to substances that prevent chewing gum from putrefying and deteriorating and extend the shelf life of chewing gums. Examples of preservatives comprise, but are not limited to, benzoic acid, sodium benzoate, sorbic acid, potassium sorbate, and mixtures thereof.

Softeners are added to the chewing gum in order to optimize the chewability and mouthfeel of the gum. Examples of softeners comprise, but are not limited to, glycerin, lecithin, and combinations thereof. Further, aqueous sweetener solutions such as those containing sorbitol, hydrogenated starch hydrolysates, corn syrup and combinations thereof may be used as softeners in the chewing gum composition. The syrups sold by Roquette under trade name Lycasin® are an example of softeners that can be used advantageously in the present invention.

Sweeteners are substances that are not simple sugars, but provides sweetness to chewing-gum, such as, but not limited to, saccharin, neotame, advantame, sucralose, aspartame, stevia extract (or steviol glycosides), acesulfame K, sugar alcohols (sorbitol, xylitol, maltitol, and erythritol), and luohanguo extract, or mixture thereof.

All types of flavouring agents well known in the art may be added to the chewing gum composition of the present invention. Flavoring agents may comprise essential oils, synthetic flavors, and mixtures thereof including but not limited to oils derived from plants and fruits such as citrus oils, fruit essences, peppermint oil, spearmint oil, clove oil, oil of wintergreen, anise, and the like. Artificial flavoring agents can also be contemplated. Those skilled in the art will recognize that natural and artificial flavoring agents may be combined in any sensorially acceptable blend.

Antioxidants refer to substances that can prevent or postpone oxidative cleavage or deterioration of oil or chewing gum ingredients and increase the chewing gum stability. Examples of antioxidants comprise, but are not limited to, butylated hydroxyanisole (BHA), butylated hydroxytoluene (BHT), propyl gallate (PG), sorbic acid, potassium sorbate, theaflavins, and mixtures thereof.

Colorants refer to substances that add color to food and/or improve the color of chewing gum. Examples of antioxidants comprise, but are not limited to, titanium dioxide, starch, and mixtures thereof.

Acidity regulators refer to substances that are used to maintain or change the pH value of chewing gum. Examples of antioxidants comprise, but are not limited to, fumaric acid, monosodium fumarate, adipic acid, and mixtures thereof.

Thickeners refer to substances that increase the viscosity or modify the texture of chewing gum. Examples of thickeners comprise, but are not limited to, funoran (gloiopeltis furcata), propylene glycol alginate, beta-cyclodextrin, diacetyl tartaric acid esters of mono (di) glycerides (DATEM), curdlan, and mixtures thereof.

Stabilizers refer to substances that maintain the quality of the chewing gums, such as flavor and texture. Examples of stabilizers comprise, but are not limited to, propylene glycol alginate, sorbic acid, potassium sorbate, curdlan, and mixtures thereof.

Coating agents refer to substances that are used to create a protective and/or decorative layer/film on the surface on a product. Examples of coating agents comprise, but are not limited to, shellac, carnauba wax, beeswax, pullulan, stearic acid, and mixtures thereof.

Coagulants refer to substances that cause, stimulate, or accelerate the coagulation of liquid or sol. Examples of coagulants comprise, but are not limited to, calcium lactate, glucono δ-lactone, curdlan, phosphoric acid, disodium dihydrogen pyrophosphate, tetrasodium pyrophosphate, calcium dihydrogen phosphate, potassium dihydrogen phosphate, diammonium hydrogen phosphate, dipotassium hydrogen phosphate, calcium hydrogen phosphate (dicalcium orthophosphate), tricalcium orthophosphate (calcium phosphate), tripotassium orthophosphate, trisodium orthophosphate, sodium polyphosphate, sodium tripolyphosphate, sodium dihydrogen phosphate, sodium phosphatedibasic, tetrapotassium pyrophosphate, trisodium monohydrogen diphosphate, potassium polymetaphosphate, calcium acid pyrophosphate, and mixtures thereof.

Additional fillers may be added to the chewing gum composition of the present invention. Examples of fillers comprise, but are not limited to, aluminium hydroxide, alumina, aluminium silicates, calcium carbonate, and talc, and mixtures thereof.

The chewing gum product may also comprise other additives, such as shellac.

The chewing gum composition may be a sugar-containing composition or a sugar-free composition. Preferably, the chewing gum composition is a sugar-free composition.

In a preferred embodiment of the present invention, the chewing gum composition comprises:

- from 5% to 70%, preferably from 10% to 55%, and more preferably from 15% to 40% by weight of gum base with respect to the total weight of the chewing gum composition,
- from 5% to 65%, preferably from 20% to 55%, and more preferably from 40% to 50% by weight of porous starch with respect to the total weight of the chewing gum composition,
- optionally from 0% to 35%, preferably from 5% to 30%, and more preferably from 10% to 25% by weight of additives with respect to the total weight of the chewing gum composition.

The present invention also relates to a chewing gum composition comprising a bulking agent containing or consisting of a porous starch as previously defined.

In a preferred embodiment, the composition does not comprise sugars and/or polyol powder such as sugar alcohols as bulking agents.

Thanks to the specific chewing gum composition as previously defined it is possible to obtain a toothfriendly chewing gum having low fermentability, being noncariogenic and nonerosive, that does not cause gastrointestinal disturbances, and without tolerance issues at all while having good mouthfeel and flavor and good processing properties. In particular, the chewing gum is a toothfriendly chewing gum having a mouthfeel and flavor delivery characteristics similar and even improved to that of a chewing gum made with sugars or polyols such as sorbitol as bulking agent and that does not create intestinal disturbances.

In the present invention "a toothfriendly chewing gum" refers to a chewing gum that has low fermentability, noncariogenic and nonerosive potential in healthy people.

The "toothfriendly" properties of a chewing gum can be determined by intraoral pH-telemetry according to a standardized method (Toothfriendly International's Standard Operation Procedures) described in *Imfeld, Th. N., Identification of Law Caries Risk Dietary Components, Monographs in Oral Science, Vol.* 11, 198pp., H. M. Myers (ed.), S. Karger A G, Basel, 1983. In this standardized method, plaque pH is measured during and for 30 minutes after consumption of the chewing gum to be tested with a plaque-covered electrode. A chewing gum is considered to have low fermentability, noncariogenic and nonerosive potential if it does not depress the pH of the interdental plaque below 5.7 by bacterial fermentation, neither during consumption nor during a period of 30 minutes following consumption.

In particular, the present inventors have found that native and porous starch were not easily fermented by bacteria in the mouth thus the pH of the interdental plaque does not drop to critical levels (pH 5.7). In a preferred embodiment of the present invention, the interdental plaque pH after the consumption of the chewing gum is not inferior to 5.7, preferably the interdental plaque pH after the consumption of the chewing gum is comprised between 5.7 and 7, and more preferably between 6 and 7.

In a preferred embodiment of the present invention, the chewing gum is coated with a maltitol coating. Indeed, the present inventors have surprisingly found that a chewing gum according to the present invention coated with a sugar free hard coating ingredient such as maltitol has a better mouthfeel.

In a preferred embodiment of the present invention, the maltitol coating comprises from 80% to 100%, preferably from 85% to 98% and more preferably from 90% to 95% of maltitol with respect to the total dry weight of the coating.

The maltitol coating optionally further comprises gum and water. The gum represents from 0% to 20%, preferably from 2% to 15% and even more preferably from 3% to 10% by weight with respect to the total dry weight of the maltitol coating. Preferably, the gum is selected from gum arabic, gelatin, and mixtures thereof.

The water represents from 15% to 40%, preferably from 20% to 35% and even more preferably from 25% to 30% by weight with respect to the total weight of the maltitol coating solution.

The maltitol coating optionally further comprises additives such as coloring agents, sweeteners, and mixtures thereof. The additives represents from 0% to 5%, preferably from 0.3% to 3% and even more preferably from 0.5% to 2% by weight with respect to the total dry weight of the maltitol coating.

An example of maltitol coating can be maltitol crystal (SweetPearl P200 commercialized by Roquette).

In a preferred embodiment of the present invention, the weight ratio of coating to the chewing gum is comprised between 0 and 1, preferably between 0.25 and 0.65 and more preferably between 0.3 and 0.5, and even more preferably 0.4.

In a preferred embodiment of the present invention, the maltitol coating represents from 0% to 50%, preferably from 20% to 40% and more preferably from 25% to 35% by weight with respect to the total weight of the coated chewing gum.

The coating can be added by a rotating disk coater, by a fluidized bed coater, by spray chilling or by a tumbler.

Another aspect of the present invention is to make a toothfriendly chewing gum with porous starch as bulking agent, while keeping mouthfeel and flavor delivery characteristics similar and even improved to that of a chewing gum made with a polyol such as sorbitol as bulking agent and that does not create intestinal disturbances.

Thus, another object of the present invention relates to a process of fabricating the chewing gum composition as previously defined comprising the step of adding porous starch as bulking agent.

In a preferred embodiment, the process of the present invention does not comprise a step of adding sugars and/or polyol powder such as sugar alcohols as bulking agents.

The chewing gum of the present invention may be manufactured by sequentially adding the various chewing gum ingredients to a commercially available mixer known in the art. After the ingredients have been thoroughly mixed, the gum mass may be discharged from the mixer and shaped into the desired form such as by rolling into sheets and cutting into sticks or strips, extruding into chunks or shapes, or casting into pellets, balls, or other shapes.

Typically, the ingredients are mixed by first melting the gum base and adding it to the preheated running mixer. The gum base may also be melted in the mixer itself. Color or emulsifiers may also be added at this time. A softener such as glycerin may also be added at this time, along with any syrup and a portion of the bulking agent and sweetener. After some agitation, the remaining bulking agent and sweetener may be added to the mixer, in portions or all at once. Any additional ingredients are typically added with the final portion of bulking agent. Mixing may occur until degree of consistency is reached. Those skilled in the art will recognize that variations of the above procedure may be followed, for example, the mixer could be continuous and the components could be added in different orders.

The present invention also relates to the chewing gum obtained from the process of the present invention.

The invention will now be illustrated by means of the following figures and examples, it being understood that these are intended to explain the invention, and in no way to limit its scope.

EXAMPLES

In the following examples, the following commercial products are used:
Gum base (optium) commercialized by Cafosa.
Sorbitol commercialized by Roquette.
Liquid maltitol (Lycasin 85/55) commercialized by Roquette.
Aspartame commercialized by Nantong Changhai.
Glycerin commercialized by Wilmar.
Liquid flavor (Mint/Vanilla RQT870565) commercialized by IFF.
The porous starch used in example 1 was produced according to the following protocol 1. Suspending native waxy maize starch in decarbonated water to 26% solid content.
2. Adjusting pH of starch slurry to 7.0 using 3.3% NaOH solution.
3. Adding thermostable α-amylase (Liquozyme Supra from Novozymes, 2.67 mg enzyme/g dry starch) and reacting at 55° C. for 4 hours.
4. Stopping the reaction by adjusting the pH to 3-3.5 using 5% hydrochloric acid solution and holding for one hour.
5. Adjusting back the pH to 4.5-5.5 using 3.3% sodium hydroxide solution.
6. Cooling the starch slurry to about 25° C.
7. Press filtering the slurry to obtain porous starch cake.
8. Washing the cake with decarbonated water.
9. Drying the cake using a flash dryer into powder with moisture content below 12%.

Figure 1:
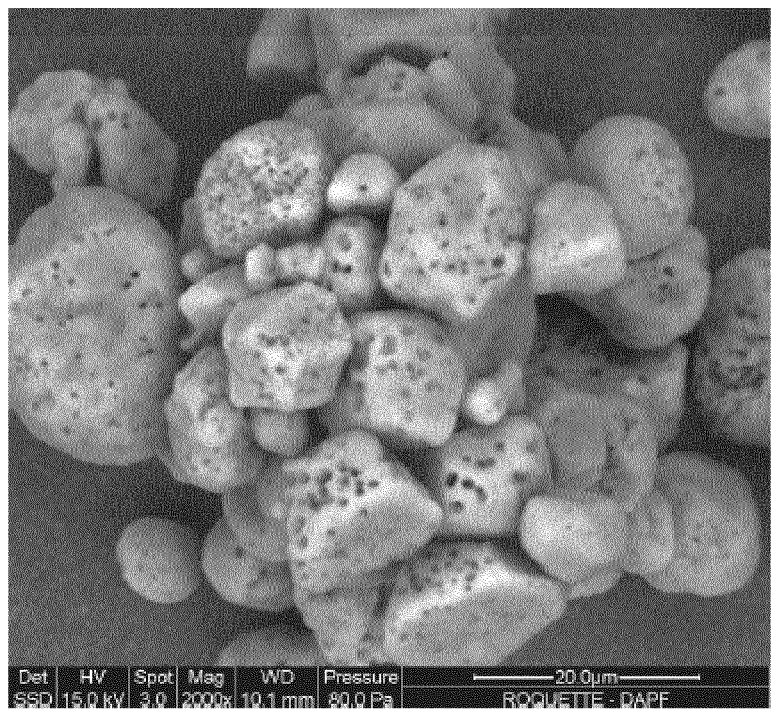
FIG. 1: scanning electron micrograph of porous waxy maize starch

The scanning electron micrograph is shown in FIG. 1.

Example 1: Fermentability of a chewing gum comprising porous starch as a bulking agent instead of sorbitol.

The recipe of the chewing gum sample to be tested (100% sorbitol substitution) is presented in table 1.

TABLE 1

| INGREDIENTS | PARTS BY WEIGHT (%) | |
| --- | --- | --- |
| | Tested chewing gum sample (100% sorbitol substitution) | Original formula |
| Gum base | 30 | 30 |
| Sorbitol (bulking agent) | 0 | 55.1 |
| Porous starch (bulking agent) | 47.1 | 0 |
| Liquid maltitol Lycasin 85/55 (softener) | 20 | 12 |
| Aspartame (sweetener) | 0.5 | 0.5 |
| Glycerin (humectant) | 1.2 | 1.2 |
| Liquid flavor (flavoring agent) | 1.2 | 1.2 |

The chewing gum sample was prepared according to the following protocol:
1. Mixing all powdered ingredients (powder mix): porous starch and aspartame
2. Loading Procedure (min)—Z blade kneader at 50° C.
   0 min: Introducing the melted gum base (heated on the stove at 50° C.), and half of powder mix.
   2 min: Adding all of liquid maltitol Lycasin 85/55.
   4 min: Adding half of powder mix.
   7 min: Adding glycerin.
   8 min: Adding liquid flavor.
   9 min: Unloading from the kneader.
3. Rolling and cutting in the form of strips
4. Conditioning, which is storing the strips at around 20° C., 50% RH for 24 hours.

The "toothfriendly quality" of the resulting toothpaste was tested by using a pH-telemetric standardized method. The product was tested in two different volunteers having a young (3-day old) plaque and a mature (4-day old) plaque.

Figure 2:
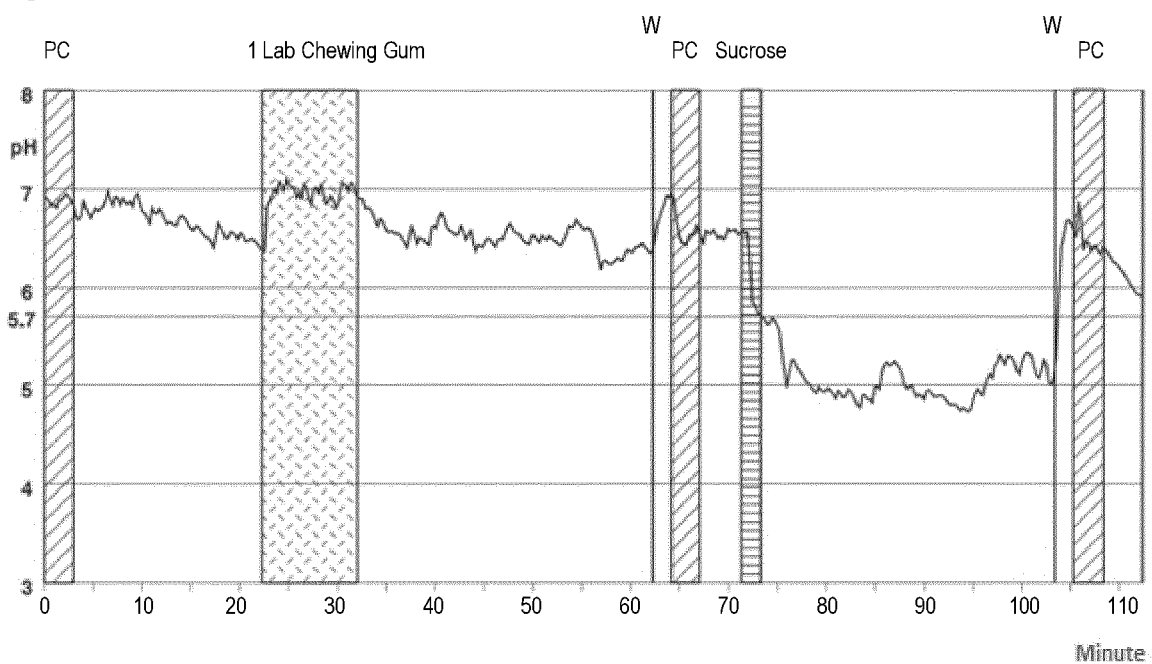
FIG. 2: pH-Telemetry results of the chewing gum of example 1 on a volunteer having a young 3-day old plaque.
Figure 3:
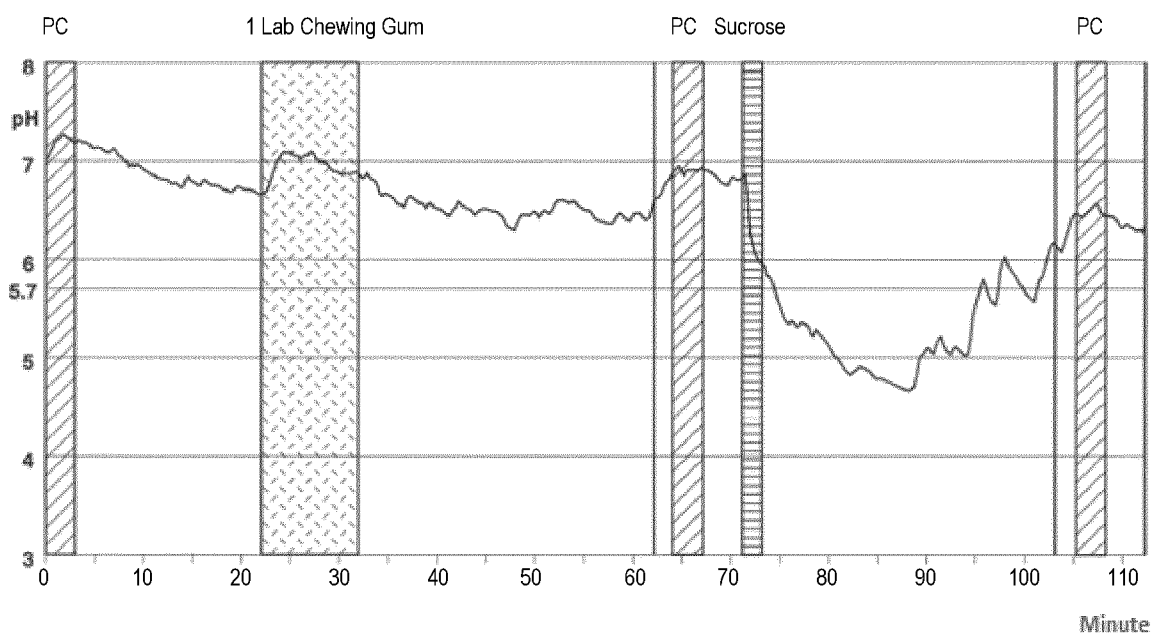
FIG. 3: pH-Telemetry results of the chewing gum of example 1 on a volunteer having a mature 4-day old plaque.

Results are shown on FIGS. 2 and 3.

As shown on FIGS. 2 and 3, the obtained plaque pH-curves demonstrated that the tested chewing gum was not associated with a depression of plaque pH below 5.7, neither during nor after 30 min of chewing. The increase of the plaque pH during water rising (W) and paraffin chewing (PC) as well as the drop of the plaque pH below 5 following positive control treatment (with 10% sucrose solution) demonstrated the proper functioning of the plaque-covered electrodes. The obtained pH curve with the plaque-covered electrode demonstrated that the tested product also lacked an erosive potential.

These results demonstrate that tested chewing gum lacks of cariogenic and erosive potential and hence is "toothfriendldy". Thus, porous starch can be used as a bulking agent in chewing gums to replace polyols such as sorbitol used as "toothfriendly" bulking agent.

The invention claimed is:

1. A method of formulating a chewing gum composition having reduced sugars and/or polyols, comprising the step of incorporating porous starch into the formulation of the composition, wherein the porous starch is incorporated to partially and/or totally replace the sugars and/or the polyols required as bulking agent in the formulation,
   wherein the porous starch is a granular starch produced through a process comprising a step of enzymatic hydrolysis of native starch granules with one or multiple amylolytic enzymes at a temperature inferior to the gelatinization temperature of the starch, and wherein the porous starch has a particle diameter comprised between 0.5 μm and 200 μm and has multiple pores on the surface with diameter comprised between 0.01 μm and 5 μm.

2. The method according to claim 1, wherein the porous starch is selected from the group consisting of tapioca starch, waxy tapioca starch, maize starch, pea starch, potato starch, waxy potato starch, wheat starch, waxy wheat starch, waxy maize starch, mung bean starch, rice starch, waxy rice starch, sweet potato starch, waxy sweet potato starch, millet starch, sago starch, sorghum starch, quinoa starch, arrowroot starch, amaranth starch, lotus root starch and buckwheat starch.

3. The method according to claim 1, wherein the porous starch replaces up to 30% by weight of the sugars and/or polyols required as bulking agent in the formulation of the chewing gum composition.

4. The method according to claim 1, wherein the porous starch is formulated in an amount in a range from 5% to 65% by weight with respect to the total weight of the chewing gum composition.

5. The method according to claim 1, wherein the chewing gum composition comprises:
   from 5% to 70% by weight of gum base with respect to the total weight of the chewing gum composition,
   from 5% to 65% by weight of porous starch with respect to the total weight of the chewing gum composition,
   optionally from 0% to 35% by weight of additives with respect to the total weight of the chewing gum composition.

6. The method according to claim 1, wherein the chewing gum is coated with a maltitol coating.

7. A chewing gum composition comprising a bulking agent containing or consisting of a porous starch as defined in claim 1.

8. A process of fabricating a chewing gum composition comprising the step of adding porous starch as defined in claim 1 as bulking agent.

9. The process according to claim 8, wherein said process does not comprise a step of adding sugars and/or polyol powder as bulking agents.

10. The method of claim 1, wherein the polyols are sugar alcohols.

11. The method of claim 1, wherein the amylolytic enzymes are selected from α-amylase, amyloglucosidase, and mixtures thereof.

12. The method of claim 1, wherein the porous starch is formulated in an amount in a range from 20% to 55% by weight with respect to the total weight of the chewing gum composition.

13. The method of claim 1, wherein the porous starch replaces up to 60% by weight of the sugars and/or polyols required as bulking agent in the formulation of the chewing gum composition.

14. The method of claim 1, wherein the porous starch replaces up to 100% by weight of the sugars and/or polyols required as bulking agent in the formulation of the chewing gum composition.

15. The method of claim 1, wherein the porous starch replaces between 30% and 100% by weight of the sugars and/or polyols required as bulking agent in the formulation of the chewing gum composition.

16. The method according to claim 1, wherein the porous starch is formulated in an amount in a range from 20% to 55% by weight with respect to the total weight of the chewing gum composition.

17. The method according to claim 1, wherein the porous starch is formulated in an amount in a range from 40% to 50% by weight with respect to the total weight of the chewing gum composition.

18. The method according to claim 5, wherein the chewing gum composition comprises from 20% to 55% by weight of porous starch with respect to the total weight of the chewing gum composition.

19. The method according to claim 5, wherein the chewing gum composition comprises from 40% to 50% by weight of porous starch with respect to the total weight of the chewing gum composition.

20. The method according to claim 5, wherein the chewing gum composition comprises from 10% to 55% by weight of gum base with respect to the total weight of the chewing gum composition.

21. The method according to claim 5, wherein the chewing gum composition comprises from 15% to 40% by weight of gum base with respect to the total weight of the chewing gum composition.

22. The method according to claim 5, wherein the chewing gum composition comprises from 5% to 30% by weight of additives with respect to the total weight of the chewing gum composition.

23. The method according to claim 5, wherein the chewing gum composition comprises from 10% to 25% by weight of additives with respect to the total weight of the chewing gum composition.

* * * * *